United States Patent [19]

Diener et al.

[11] Patent Number: 5,326,812
[45] Date of Patent: Jul. 5, 1994

[54] AQUEOUS COATING AGENT AND AQUEOUS EMULSION, PROCESS FOR THE PREPARATION THEREOF

[75] Inventors: Wolfgang Diener; Manuela Krieter, both of Wuppertal; Ronald Obloh, Dortmund; Peter Schreiber, Hattingen, all of Fed. Rep. of Germany

[73] Assignee: Herberts Gesellschaft mit beschrankter Hafrung, Wuppertal, Fed. Rep. of Germany

[21] Appl. No.: 117,436

[22] Filed: Sep. 7, 1993

[30] Foreign Application Priority Data

Sep. 8, 1992 [DE] Fed. Rep. of Germany ....... 4229982

[51] Int. Cl.$^5$ .............................................. C08L 75/06
[52] U.S. Cl. .................... 524/507; 524/591; 524/377; 524/246; 524/248; 524/236
[58] Field of Search ............... 524/507, 591, 377, 246, 524/248, 236

[56] References Cited

U.S. PATENT DOCUMENTS 5,075,370 12/1991 Kubitza et al. ..................... 524/591
5,227,198 7/1993 Laura et al. ........................ 524/377

Primary Examiner—Joseph L. Schofer
Assistant Examiner—Jeffrey T. Smith
Attorney, Agent, or Firm—Schweitzer Cornman & Gross

[57] ABSTRACT

An aqueous coating agent on the basis of one or more polyols having ionic groups or groups convertible into ionic groups, which can contain pigments, fillers and/or optional conventional lacquer adjuvants and/or solvents, comprising A) 10 to 40 wt.-% of one or more polyols having a number-average molecular weight (Mn) of 500 to 200000, an OH-number of 15 to 300 and a content of ionic groups and/or groups convertible into ionic groups of 5 to 400 meq/100 g solid resin, which are at least partly neutralized, B) 0.5 to 10 wt.-% of one or more chlorinated polyolefines having a chlorine content of 15 to 35 wt.-%, C) 5 to 40 wt.-% of one or more aromatic solvents having a boiling range from 100° to 160° C., D) 25 to 75 wt.-% of water, E) 0 to 30 wt.-% of one or more further water dilutable binders which are free from groups reactive with NCO, the percentages by weight of components A) to E) adding up to 100 wt.-% and F) one or more polyisocyanates having on average at least two free isocyanate groups per molecule, in such an amount that the ratio of the number of reactive isocyanate groups to the OH-groups of the polyols is 0.5:1 to 5:1, the coating agent being a two-component system, one component containing the polyols and the other component containing the polyisocyanates.

8 Claims, No Drawings

AQUEOUS COATING AGENT AND AQUEOUS EMULSION, PROCESS FOR THE PREPARATION THEREOF

The invention refers to aqueous coating agents on the basis of polyols which can be crosslinked with polyisocyanates and which contain chlorinated polyolefines as adhesion mediators. The invention relates also to the preparation of the aqueous coating agents from the aqueous emulsions containing chlorinated polyolefines; it refers also to the use of the coating agents especially for coating plastic materials.

Aqueous two-component systems on the basis of epoxide resins and amino resins have been described in DE-A-41 23 860. This reference refers to specific dispersions from epoxide resins, amino resins and polyurethanes which are used together with pigments and adjuvants for the preparation of primers for the automotive industry. EP-A-0 358 979 describes aqueous two-component coating agents consisting of an acrylate component and a polyisocyanate component. Such coating agents can be used for metal substrates; however, if they are used for coating plastic materials, especially polyolefines, the adhesion to the substrate is not sufficient. This is demonstrated by a low resistance against water of the coated substrates. Further it is not possible to prepare thick layers with such coating agents. Preparing thicker layers furnishes defects such as small blisters and pin holes. DE-A-39 10 901 and the corresponding WO 90/12056 describe coating compositions for plastic materials containing water, a film-forming binder system, chlorinated polyolefines (CPO), as well as optional pigments and adjuvants. The film-forming binders are acrylate resins or polyurethane resins in an aqueous emulsion. After application of such coating agents the systems dry physically. For the preparation of such coating agents it is necessary to use specific emulsifiers as well as a melt process for the chlorinated polyolefines; further it is necessary to carry out an azeotropic destillation of all organic solvent components. This is very costly.

DE-A-41 31 127 describes adhesion primers on the basis of chlorinated polyolefines, organic solvents, water, emulsifiers as well as pigments and an optional film-forming binder which can be used for coating plastic materials. The systems dry physically, i.e. no chemical reaction occurs in the coated film. If such primer layers are coated with coating agents containing organic solvents, the risk of re-dissolving of the primer layer has to be taken into consideration. Otherwise defects of the coated surfaces can occur.

EP-A-0 466 136 describes specific aqueous coating agents for coating plastic substrates, containing a combination of olefine resins, urethane resins and epoxide resins. An example for an olefine is chlorinated polypropylene.

It is the object of the present invention to provide aqueous coating agents which can be used for coating plastic moldings, especially in the automotive industry and which furnish coatings having a good impact resistance even when cold, having a smooth surface free of defects even if thick layers are applied.

It has been found that this object can be achieved by an aqueous coating agent on the basis of one or more polyols having ionic groups or groups convertible into ionic groups, which can contain pigments, fillers and/or conventional lacquer adjuvants, comprising:

A) 10 to 40 wt.-% of one or more polyols having a number average molecular weight (Mn) of 500 to 200000, an OH-number of 15 to 300 and a content of ionic groups and/or groups convertible into ionic groups of 5 to 400 meq/100 g solid resin, which are at least partly neutralized, the ionic groups being preferably anionic groups, B) 0.5 to 10 wt.-% of one of more chlorinated polyolefines having a chlorine content of 15 to 35 wt.-%, C) 5 to 40 wt.-% of one or more organic solvents having a boiling range from 100° to 160° C., D) 25 to 75 wt.-% of water, E) 0 to 30 wt.-% of one or more further water dilutable binders which are free from groups reactive with NCO, the percentages by weight of components A) to E) adding up to 100 wt.-% and F) one or more polyisocyanates having on average at least two free isocyanate groups per molecule, in such an amount that the ratio of the number of reactive isocyanate groups to the OH-groups of the polyols is 0.5:1 to 5:1, the coating agent being a two-component system, one component containing the polyols and the other component containing the polyisocyanates.

It has been found that the coating agents of the invention can be prepared from aqueous emulsions of one or more chlorinated polyolefines having a chlorination degree of 15 to 35 wt.-%. They can be prepared essentially or totally free from emulsifiers if they are dispersed together with polyols; the polyols are such which can be used in the aqueous coating agents of the invention. However, it is also possible to prepare the coating agents of the present invention in any other way. For example, the chlorinated polyolefines can be used together with an emulsifier.

The coating agents of the present invention are especially two-component systems, one component containing the polyols and the other containing the polyisocyanates. The polyol component is diluted with water; the polyisocyanate component can be dispersed together with the polyol component in water. The chlorinated polyolefines, as well as the optional pigments, fillers and conventional lacquer adjuvants can be contained in one or both components. It is clear that any substances which are dispersed in the polyol component A) should be compatible with water in order to achieve a good storage stability. Additives which are used with the polyisocyanate-crosslink component should not be reactive with the polyisocyanates. Generally it is convenient to disperse organophilic substances in the polyisocyanate component.

The polyol component A) which can be used in accordance with the present invention is especially based on binders on the basis of radically polymerisable monomers containing OH-groups, OH-group containing polyesters and/or OH-group containing polyurethanes. The number-average molecular weight is 500 to 200,000, the OH-number is 15 to 300 mg KOH/g solid resin. The dispersability in water is achieved by polar groups, e.g. OH-groups, ether groups, urethane groups, ionic groups or groups which are convertible into ionic groups. It is possible to use kationic groups or groups which are convertible into kationic groups, e.g. amino groups; however, anionic groups or substituents convertible into anionic groups, e.g. carboxyl groups, phosphoric acid groups and sulfonic acid groups are especially convenient. Polymers having carboxyl groups are preferred. The content of ionic groups is 5–400 meq/100 g solid resin. The polyol component is provided in the form of an aqueous dispersion having a viscosity of 100–10000 mPas at 23° C. The pH is 5–10.

Examples for suitable COOH- and OH-groups containing polymers on the basis of olefinically unsaturated monomers are described in EP-A-0358979. These are aqueous dispersions on the basis of olefinically unsaturated monomers. Such monomers can be free from functional groups, examples are styrene, (meth)acrylic acid alkylesters having $C_1$-$C_8$ in the side chain, vinyl acetate or (meth)acrylonitrile. Further, at least parts of the monomers can have functional groups, e.g. hydroxyl groups, such as hydroxyalkyl ester of (meth)acrylic acid, for example 2-hydroxyethyl acrylate or 2-hydroxypropyl acrylate. Further it is possible to insert other reactive groups, e.g. epoxide groups or amido groups, using monomers such as, e.g. glycidyl(meth)acrylate or N-methoxymethyl(meth)acrylamide. The ionic groups can be inserted using olefinically unsaturated monomers, containing functional groups which can be converted into ionic groups, e.g. olefinically unsaturated mono- or dicarboxylic acids having a molecular weight of 72–207, such as, e.g. acrylic acid, maleic acid, itaconic acid and the halfesters thereof or using compounds such as 2-acrylamide-2-methylpropane-sulfonic acid.

The preparation of the polymerisates is carried out in accordance with usual processes, e.g. as polymerisation in solution. It is possible to use continuous and discontinuous processes. The copolymerisation is generally carried out using initiators and optional regulating compounds at temperatures of 50° to 160° C. It is carried out in a liquid wherein monomers or polymers are both soluble. Preferred solvents are organic solvents which are not detremental to the coating agents to be formulated. The solvents are preferable organic solvents which are at least partly miscible with water. Generally the initiators are used in amounts of 0.1 to 3 wt.-%, relating to the amount of monomers; examples are peroxides and/or azocompounds and/or peresters. Specific examples are benzoyl peroxide, cumol hydroperoxide, tert.-butyl peroctoate or 2.2-azobis(2-cyanopropane).

It is possible to reduce the molecular weight by the use of regulating compounds. Preferred regulating compounds are mercaptanes, halogene containing compounds or other substances transferring radicals. Specific examples are n-dodecyl mercaptane, butan-1-ol or dimeric α-methyl styrene.

Examples for solvents for the polymerisation are aromatic solvents such as toluene, xylene; esters, such as ethyl acetate, butyl acetate, ethyl glycol acetate; ethers such as butylglycol or ethylglycol ether; ketones such as acetone or methylethyl ketone. If desired the solvents can be removed by destillation, preferably in vacuum from the polymerisates before or after dilution with water.

The number average molecular weight (Mn) of the binders on the basis of radically polimerisable monomers is preferably 500 to 50,000, particularly preferred from 1000 to 10,000. The OH-number is 15–300, preferably 30–170 mg KOH/g solid resin. The content of polar, e.g. anionic, groups is 5–400 meq, preferably 25 to 280 meq per 100 g solid resin.

Examples for acidic water dispersable polyurethane resins are described in DE-A-41 24 453 and DE-A-40 00 889. Examples are polyurethane resins prepared by the reaction of two valent or multivalent saturated linear or branched aliphatic or cycloaliphatic polyalcohols with linear or branched aliphatic, cycloaliphatic or aromatic polyisocyanates, e.g. diisocyanates, and optional linear or branched aliphatic or cycloaliphatic monoalcohols. In order to insert ionic groups, it is, e.g. possible, to insert by reaction low molecular dialcohols having an anionic group or a group convertible into an anionic group, preferably a carboxyl group.

The reaction is carried out at temperatures from 20° to 150° C., optionally using catalysts. The reaction can be carried out by melting or in solution in inert dry solvents. A stepwise reaction is also possible. Linear or branched molecules are formed in accordance with the amount of multivalent polyols. If an excess of alcohols is used, terminal hydroxy groups are formed at the end of the chains.

The polyols based on polyurethanes have preferably an OH-number of 20 to 200. The acid number is preferably 10 to 200, especially preferred 25 to 150. The number average molecular weight (Mn) is preferably 3000 to 200,000. In accordance with a preferred embodiment the water dispersable polyurethane resins for component A) have an number-average molecular weight of 3000 to 50,000, an OH-number of 30 to 150 and an acid number of 25 to 70. Particularly preferred are carboxyl groups as groups convertible into anionic groups.

Examples for polyols which can be used in accordance with the present invention are hydroxy groups containing polyesters having anionic groups as described in DE-A-32 13 160, DE-A-28 24 418 and U.S. Pat. No. 3,053,783. In accordance with the present invention it is possible to use linear or branched oil-free polyesters on the basis of two valent or multi-valent linear or branched aliphatic or cycloaliphatic saturated polyalcohols and linear or branched aliphatic, cycloaliphatic or aromatic two valent or multi-valent carboxylic acids which can be polycondensed with linear or branched aliphatic monoalcohols.

Preferably the alcohols contain 2 to 21 C-atoms; the two valent or multi-valent carboxylic acids contain preferably 5 to 10 C-atoms. Examples for polyalcohols are diols, such 2.6-hexanediol, neopentilglycol, 2.2.4-trimethylpentanediol-1.3 or 1.4-bis-(hydroxymethl)cyclohexane. Examples for dicarboxylic acids are isophthalic acid, terephthalic acid, 1.3-cyclohexanedicarboxylic acid or butylisophthalic acid. It is also possible to use small amount of tricarboxylic acids or trialcohols or polyalcohols in order to achieve branched structures. It is, e.g., possible to insert anionic groups additionally by reaction with a low molecular dialcohol containing an acid group which can be transformed into an anion, e.g. sulfonic acid groups, phosphoric acid groups or carboxyl groups. Particularly preferred are carboxyl groups, which, e.g., can be inserted by the use of dimethylolpropionic acid.

It is also possible to enhance the molecular weight of the polyesters by reaction with diisocyanates. Further, it is possible to modify them via reactive groups, e.g. OH-groups.

The polyesters which can be used in accordance with the present invention have preferably a number-average molecular weight (Mn) from 1500–15000, particularly preferred from 2000–6000. The OH-number is preferably 20 to 200, particularly preferred 40 to 150. The acid number is preferably 20 to 150.

The preparation of the polyesters can be carried out in accordance with known processes. It is preferred to work stepwise. They can, e.g., be prepared azeotropic or in a melt. The reaction temperature is, e.g., 150° to 240° C. After achieving of the desired parameters, it is optionally possible to dilute the polyester with solvents in order to achieve a good working viscosity.

The qualities of the polyesters can be influenced by the used dicarboxylic acids or polyalcohols. Thus, long chain aliphatic alcohols enhance the flexibility of the polyesters; aromatic dicarboxylic acids reduce the elasticity. The branching degree can be influenced by the amount of used tricarboxylic acids. The water dispersability of the binders is influenced by the amount of polar groups, e.g. OH-groups, ether groups, urethane groups or ionic groups.

The polyols A) which can be used as binders in accordance with the invention, can be transformed into the aqueous phase after neutralisation of at least a part of the present ionic groups, without addition of emulsifiers. The obtained aqueous systems can be real solutions, colloid disperse systems or dispersions. It is possible that they still contain small amounts of organic solvents from their preparation; however, such organic solvents can also be added in order to improve specific qualities such as flow or dispersability. It is possible to assist the transformation into the aqueous phase by, e.g., enhancing the temperature. However, it is also possible to remove the organic solvents by destillation from the aqueous dispersion.

The crosslinking component F) used in accordance with the invention contains polyisocyanates which, on average, contain at least two free isocyanate groups per molecule. Examples for such polyisocyanates are described in EP-A-0 358 979. They are organic polyisocyanates, e.g. diisocyanates, with aliphatic, cycloaliphatic and/or aromatic bound free isocyanate groups, which are liquid at room temperature, which can also be achieved by the addition of solvents.

The ready polyisocyanate component has a viscosity of 50–10,000, preferably 50–1000 mPas at 23° C. If necessary, it is possible to mix different polyisocyanates. Further, it is also possible to add inert solvents in order to reduce the viscosity to a desired degree. In order to achieve this it is preferred to use solvents which are partly mixable with water.

Examples of usable polyisocyanates are the known conventional lacquer polyisocyanates such as, e.g., hexamethylene diisocyanate (HDI), isophorone diisocyanate (IPDI), toluylene diisocyanate (TDI) and tetramethyl xylylene diisocyanate (TMXDI). Such diisocyanates can be transformed by known processes into oligomers, which, e.g. contain biuret groups, urethane groups, uretdione groups or isocyanurate groups. It is also possible to react them with lower alcohols, e.g. trimethylolpropane. Polyisocyanates containing biuret groups on the basis of HDI as well as the corresponding cyclic trimerisates of HDI are preferred. The use of oligomers on the basis of TMXDI is also preferred. The isocyanates can be used as such or in the form of mixtures. The average functionality is 2 or more.

The chlorinated polyolefines (CPO) which can be used as component B) in accordance with the invention, are commercial products. They are, e.g., chlorinated polyethylene, chlorinated polypropylene or chlorinated polyethylene/polypropylene copolymers or mixtures thereof. The chlorinated polyolefines have a chlorination degree (a chlorine content) of 15–45 wt.-%. Generally they are dissolved in organic solvents. However, it is also possible to use them in the form of an aqueous dispersion.

A further object of the present invention are aqueous emulsions of chlorinated polyolefines, which, e.g., can be prepared from a solvent-containing form of the chlorinated polyolefine B) together with the water dilutable polyol component A) (totally or partial) and optional water and/or aromatic solvents. In this case the polyol component A) can be in the form of a binder and can be disperged with the further components with water, or it is possible to use an aqueous dispersion of the polyol. This can be achieved by mixing the components with known disperging apparatus; if desired it is possible to prepare a pre-emulsion which can further be treated with disperging apparatus, e.g. rotor-stator-mixers, impellers, such as propellers, ultrasonic mixers or high-pressure homogenisators. Working in this way it is possible to omit emulsifiers. It is also possible to start with CPO-powders without solvents and to add the necessary amounts of aromatic solvents together with the water.

Examples for solvents are organic solvents having a boiling range of 100° to 160° C., especially aromatic solvents, such as toluene, xylene or mixtures thereof.

Preferably the emulsions of the present invention have a content of 10 to 100 wt.-% of one or more aromatic solvents having a boiling range from 100° to 160° C., as exemplified above. The amount of CPO is, e.g., 5 to 70 wt.-%, relating in each case to the polyol component. The emulsions of the present invention are storage-stable products; no phase separation occurs. It is possible to use them directly for the preparation of the coating agents of the invention, e.g. by direct addition to the coating agents or to one or both components thereof.

The emulsion prepared in accordance with the invention can be used directly for the preparation of the coating agents of the invention. However, it is also possible to use other dispersions of chlorinated polyolefines in the coating agents. Examples for usable dispersions of chlorinated polyolefines (CPO) are described in DE-A-41 31 127. They are aqueous CPO-dispersions containing aromatic solvents and an anionic emulsifier. Examples for the aromatic solvents are specified above. The content of aromatic solvents is, e.g., 15 to 50 wt.-%. The described aqueous solvent containing CPO-dispersions are prepared by disperging the CPO in the form of a powder, slurry or an organic solution using an emulsifier in water at an elevated temperature.

During the preparation of the polyol-containing emulsion of the present invention as well as during the preparation of the described emulsion which is free from binders, it is possible to start with the preparation of a pre-emulsion which is optionally added with water, further organic solvents or adjuvants in order to achieve a suitable solids content and which is further homogenized. The obtained dispersions have a good distribution of the particle size in the aqueous phase. It is possible to directly add the dispersions to the coating agent or to one or both components thereof.

It is possible that the coating agents of the invention contain additional water dilutable binders E) which essentially do not contain any groups which can be crosslinked with the isocyanates under curing conditions, e.g. water dilutable polyurethane resins or acrylate resins or polyester resins. They are preferably aqueous polymer dispersions which are admixed to the polyol of component A). The maximum amount of such binders is 75 wt.-% relating to the reactive film-forming polyol.

Further, the coating agents of the invention can contain conventional lacquer additives such as defoaming agents, wetting agents, thickening agents, anti cratering agents, flowing agents, light protective agents or catalysts. The added substances shall be compatible with the component to be admixed or they shall form a storage-stable form. If the necessary amount of solvents cannot be inserted by the CPO-emulsion or by the binders it is also possible to add further organic solvents to the coating agents. They can be conventional lacquer solvents, especially aromatic solvents which are known to the person skilled in the art. The total amount is 5 to 40 wt.-%.

The coating agents of the invention can also contain organic and/or inorganic pigments or fillers. Examples are organic and inorganic coloured pigments, effect pigments such as metallic pigments, mica, alluminium silicate, titanium dioxide, barium sulfate, high disperse silica and corrosion protective pigments. It is also possible to add crosslinked organic polymer particles as fillers. The pigments and/or fillers have a preferred particle size of 15 μm and less. This can be achieved by grinding the pigments in auxiliary substances, e.g. paste resins or wetting resins. The processes for disperging pigments are described in the literature and are known to the person skilled in the art.

In order to prepare the coating agents, the film-forming resins are transformed in the aqueous phase. They can be totally or partially neutralized before or after transformation into the aqueous phase, in order to achieve a stable aqueous emulsion. The solvent-containing CPO-composition is contained in the binder component as an aqueous solvent containing a dispersion or as an emulsified organic solution; further non-reactive aqueous binders can also be contained. This component can contain optional adjuvants or pigments and fillers. If the pigments are directly disperged into the aqueous binder composition, it is necessary to take into consideration that the stability of the dispersion is not impaired by the binding process. On the other hand, it is also possible to add ground aqueous pigment compositions, e.g. so-called pigment pastes, to the dispersion of binders.

The coating agents of the invention are two-component systems (2K-systems).

The second component contains the polyisocyanate F). Other adjuvants, e.g. defoaming agents, to achieve good lacquer effects, as well as pigments, can also be contained in this component. It is also possible to insert into this component at least a part of the CPO. Only such components should be added to the polyisocyanates which are not reactive with the isocyanate groups. It is possible to adjust the viscosity of this component by the addition of inert solvents.

The coating agent is obtained ready for use by dispersing the polyisocyanate component into the aqueous dispersion of the binder component. The amounts are chosen in such a way that the ratio of the amount of reactive NCO-groups to the amount of OH-groups is 0.5:1 to 5:1, preferably 0.8:1 to 2:1. It is necessary to mix those components well.

A preferred embodiment of the coating agents of the invention comprises

10–40 wt. % of binder and crosslinking agent
0.5–7 wt. % of CPO
5–30 wt. % of aromatic solvents -continued 0–25 wt. % of pigments and/or fillers
0–15 wt. % of further binders and
25–75 wt. % of water.

Depending on the kind of application the coating agent can be adjusted with water to a desired viscosity. The kind and amount of pigments and fillers are chosen in accordance with the desired use. For primer coatings the pigment content is high. For the use as a top coat the pigment content is mostly within the lower range of amounts and the pigments are coloured or effect pigments. Clear coats do not contain pigments, however transparent colouring agents can be used.

The coating agents of the invention can be used on substrates such as metals and plastic materials. Plastic substrates are especially preferred. Examples are modified or non-modified polyolefines, especially polyethylene or polypropylene, polycarbonate, polyamide, ABS-polymers, polyurethanes or polyesters. Polyolefine substrates are preferred. It is possible to use known processes for the application of the coating agents, such as painting, rolling, spraying or dipping. The coating agents can be applied directly to the purified substrate; it is not necessary to use an adhesive primer. Preferably the thickness of the layers is 5–75 μm. However, surprisingly it has been found that even with thick layers a smooth surface without blisters or pinholds is achieved.

Crosslinking of the coating agents is achieved at temperatures of, e.g. 10° to 120° C., preferably 40° to 100° C. The crosslinking speed can be influenced by addition of usual catalysts. If desired it is possible to insert an aeration phase at low temperatures after application before crosslinking by heating. The crosslinking temperature can be chosen in accordance with the temperature sensibility of the substrate.

Homogenously coated substrates are achieved after crosslinking, e.g. plastic substrates having a good adhesion between film and substrate. The surface is smooth and free from defects even when preparing thick layers. Also the adhesion to further coating layers is good. It is possible to achieve thick layers without defects of the surface of the films by blisters or sagging. The mechanical qualities of the coated material, e.g. the impact resistance is not impaired, even when cold. The coating agents are especially useful for the preparation of basecoat layers in multi-layer systems. It is possible to apply one or more further coatings, e.g. transparent coatings, stonechip-resistant coatings or base coats/top coats to the thus obtained coatings. The achieved multi-layer coating shall have a good adhesion at the substrate and a good elasticity even when cold. They can be used without additional adhesion primer. A further preferred embodiment comprises the use as a one-component top coat. The coating agents of the invention are especially useful for coating plastic pieces in the automotive industry or the industry furnishing the automotive industry. However, they can also be used for coating of other substrates, especially temperature sensitive plastic.

The following examples explain the invention. Percentages relate to the weight unless stated otherwise.

EXAMPLE 1

29 wt.-% of a 25% solution of a chlorinated polypropylene having a chlorine content of 18% in xylene are added to 66% of a 26.5% dispersion of an acrylate resin (in accordance with example G of EP-A-0 358 979) and 5% water. The mixture is homogenized thoroughly using a propeller at 9000 rpm at 23° C. and using an eccentric geometry of agitation. It has to be ensured that no unagitated zones remain in the material to be dispersed. The CPO-solution is added slowly. (Solids content ca. 25%).

EXAMPLE 2

50 wt.-% of an aqueous polyurethane dispersion (in accordance with DE-OS-40 00 889 solids content 35%) are added with 14% water and slowly mixed with 26% of a 25% solution of a chlorinated polypropylene having a chlorine content of 18% in xylene. The mixture is thoroughly homogenized with a propeller at ca. 9000 rpm at 23° C. using an eccentric geometry of agitation. The existence of unagitated zones in the material to be dispersed is to be avoided (solids content ca. 24%). The obtained aqueous solvent containing emulsions are storage-stable and they can be used for the preparation of coating agents.

PREPARATION EXAMPLE 3

34.5% of an aqueous acrylate resin (in accordance with example F) of EP-A-0 358 979, solids content ca. 28%) are mixed with 4.0% demineralized water and a premixture of 0.15% of a commercial acrylate thickener (Acrysol RM 8) and with 0.95% water. 0.15% of a commercial ionic emulsifier and 0.15% of a defoaming agent are added and homogenized. 17.4% titanium dioxide, 3.8% talc and 0.05% carbon black are added successively into this mixture. The viscosity is adjusted with ca. 1.75% water and the mixture is grounded on a bead mill for 30 minutes.

This mixture is added slowly with a stable emulsion (in accordance with DE-A-41 31 127) from 9.65% of a commercial CPO (solids content 25% in xylene), 0.65% of an emulsifier on the basis of alkyl sulfonate and 9.0% demineralized water. A storage-stable aqueous CPO/xylene containing component is obtained.

PREPARATION EXAMPLE 4

32.35% of an aqueous acrylate resin (in accordance with example F) of EP-A-0 358 979, solid content ca. 28%) are mixed with 3.9% demineralized water and a premixture of 0.15% of a commercial acrylate thickener with 0.95% water. 0.15% of a commercial emulsifier and 0.15% of a defoaming agent are added and homogenized. 16.3% titanium dioxide, 3.6% talc and 0.05% carbon black are successively disperged into this mixture. The viscosity is adjusted with ca. 1.6% water and the mixture is ground in a bead mill for 30 minutes.

A stable emulsion of 15.1% of a commercial CPO (solids content 25% xylene), 1.0% of an emulsifier on the basis of alkylsulfonate and 14.1% demineralized water is slowly added to this mixture. A storage-stable aqueous CPO/xylene-containing component is achieved.

PREPARATION EXAMPLE 5

55.0% of an emulsion according to example 1 are mixed with a premixture of 0.15% of a commercial acrylate thickener with 0.95% water. 0.1% of a commercial ionic emulsifier, 0.2% of a defoaming agent and 1.8% water are added and homogenized. 17.0% titanium dioxide, 3.8% talc and 0.05% carbon black are successively disperged into this mixture. The viscosity is adjusted with ca. 1.5% water and the mixture is ground in a bead mill for 30 minutes.

EXAMPLE 6

82.2% of the component of example 3 are mixed with 11.2% of a solution of 4.65% of a mixture of aliphatic hydrocarbons and 6.65% of a mixture of oligomer biuret and isocyanurate-group containing HDI-condensation products having a NCO-content of 22%; the resultant mixture is homogenously agitated. An application viscosity is achieved by adjusting with 6.6% water.

EXAMPLE 7

89.4% of the component according to example 4 are mixed with 9.3% of a solution of 3.0% of a mixture of aliphatic hydrocarbons and 6.3% of a mixture of oligomeric biuret and isocyanurate group containing HDI-condensation products having a NCO-content of 22% and the mixture is homogenously stirred. 1.3% solvent are admixed in order to adjust application viscosity.

EXAMPLE 8

80.4% of the component of example 5 are added with 5.9% of a mixture of oligomeric biuret and isocyanurate group containing HDI-condensation products having a NCO-content of 22%; the obtained mixture is homogenously stirred. 13.65% water are added in order to adjust application viscosity.

Adhesion primer tests

The resultant primer coatings are sprayed onto a plastic substrate (Hostalen PPX 653 of Hoechst AG) which had been degreased, in order to achieve a dry film thickness of ca. 25 $\mu$m. The film is aerated for 15 minutes and then dried for 15 minutes at 80° C. Then a further conventional coating system is applied.
Multilayer system:
- 25 $\mu$m 2K-primer according to examples 6 to 8
- 15 $\mu$m commerical water base coat (Diamantsilber 65 120 of Herberts GmbH)
- 35 $\mu$m commercial two-component polyurethane clear lacquer (47 891 of Herberts GmbH)

The tests of humidity resistance (DIN 50017, condensed water test climate, adhesion to the following layers) and the elasticity at a flexural test even at −20° C. (DIN 53152 or ISO 6860, adhesion to the substrate) demonstrate good results.

A comparative test was carried out in analogy with example 4, however omitting the CPO-polymer in the coating agent. This test demonstrated an essentially worse result of the adhesion test.

EXAMPLE 9

36.9% of an aqueous acrylate dispersion (Bayhydrol VPLS 2940, solids content 30%) are mixed under agitation with 7.4% demineralized water, 1.3% of a commercial acrylate thickener, 0.15% of a commercial emulsifier and 0.25% of a commercial defoaming agent, whereafter the mixture is mixed with 22.2% titanium dioxide. This mixture is homogenously stirred and ground in a bead mill. 25.2% of a commercial CPO (20% in xylene) are added to this mixture and homogenized.

The thus obtained binder mixture is mixed with 6.6% of a commercial mixture of oligomeric HDI-condensation product having a NCO-content of 22% and the obtained composition is homogenously mixed. The viscosity for application is achieved by the addition of a low amount of water.

The thus obtained topcoat agent is sprayed onto a degreased plastic substrate in order to achieve a dry-film thickness of ca. 40 μm. The film is aerated for 15 minutes and then dried for 15 minutes at 80° C.

The elasticity is tested by a flexural test (ISO 6860 or DIN 53152).

The adhesion to the substrate is good.

The adhesion to the substrate is clearly better than with a comparative test being carried out without the CPO-solution.

We claim:

1. An aqueous coating agent on the basis of one or more polyols having ionic groups or groups convertible into ionic groups, which can contain pigments, fillers and/or optional conventional lacquer adjuvants and/or solvents, comprising
    A) 10 to 40 wt.-% of one or more polyols having a number-average molecular weight (Mn) of 500 to 200000, an OH-number of 15 to 300 and a content of ionic groups and/or groups convertible into ionic groups of 5 to 400 meq/100 g solid resin, which are at least partly neutralized,
    B) 0.5 to 10 wt.-% of one or more chlorinated polyolefines having a chlorine content of 15 to 35 wt.-%,
    C) 5 to 40 wt.-% of one or more aromatic solvents having a boiling range from 100° to 160° C.,
    D) 25 to 75 wt.-% of water,
    E) 0 to 30 wt.-% of one or more further water dilutable binders which are free from groups reactive with NCO, the percentages by weight of components A) to E) adding up to 100 wt.-% and
    F) one or more polyisocyanates having on average at least two free isocyanate groups per molecule, in such an amount that the ratio of the number of reactive isocyanate groups to the OH-groups of the polyols is 0.5:1 to 5:1, the coating agent being a two-component system, one component containing the polyols and the other component containing the polyisocyanates.

2. An aqueous coating agent according to claim 1, characterized in that component A) contains anionic groups and/or substituents which are convertible into anionic groups.

3. An aqueous emulsion on the basis of one or more polyols having ionic groups or groups convertible into ionic groups, usable for the preparation of the aqueous coating agents of claim 2, comprising:
    A) 10 to 40 wt.-% of one or more polyols having a number average molecular weight (Mn) of 500 to 200,000, an OH-number of 15 to 300 and a content of ionic groups and/or groups convertible into ionic groups of 5 to 400 meq/100 g solid resin, which are at least partly neutralized,
    B) 0.5 to 10 wt.-% of one of more chlorinated polyolefines having a chlorine content of 15 to 35 wt.-%,
    C) 5 to 40 wt.-% of one or more aromatic solvents having a boiling range from 100° to 160° C., and
    D) 25-75 wt.-% of water.

4. An aqueous emulsion according to claim 3, characterized in that component A) contains anionic groups and/or groups convertible into anionic groups.

5. Coating agent or emulsion in accordance with claim 1 or 3, characterized in that the polyol is based on radically polymerizable, olefinically unsaturated monomers having an OH-number of 15-300 and an acid number of 2-250.

6. Coating agent or emulsion according to claim 1 or 3, characterized in that the polyol is a polyurethane resin having an OH-number of 20-200 and an acid number of 10-200.

7. Coating agent or emulsion according to claim 1 or 3, characterized in that the polyol is a polyester having an OH-number of 20-200 and an acid number of 20-150.

8. Coating agent or emulsion according to claim 1 or 3, characterized in that it is essentially or totally free from emulsifiers.

* * * * *